Figure 3:
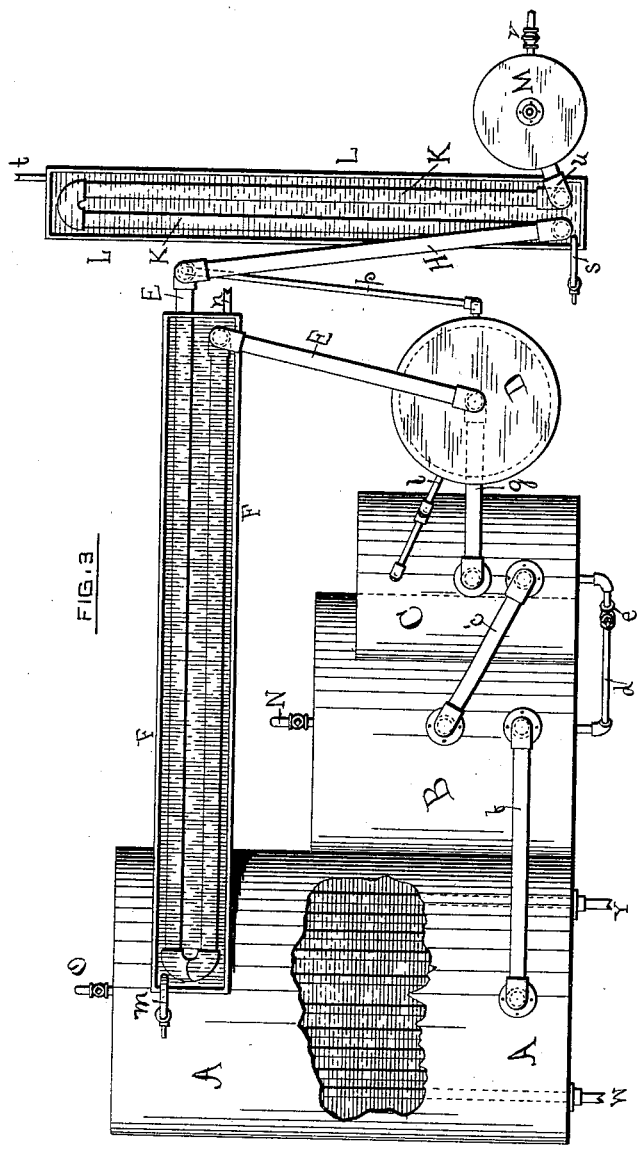

(No Model.)   2 Sheets—Sheet 1.
B. P. CLAPP.
APPARATUS FOR DISTILLING AMMONICAL WATERS.
No. 335,427.  Patented Feb. 2, 1886.
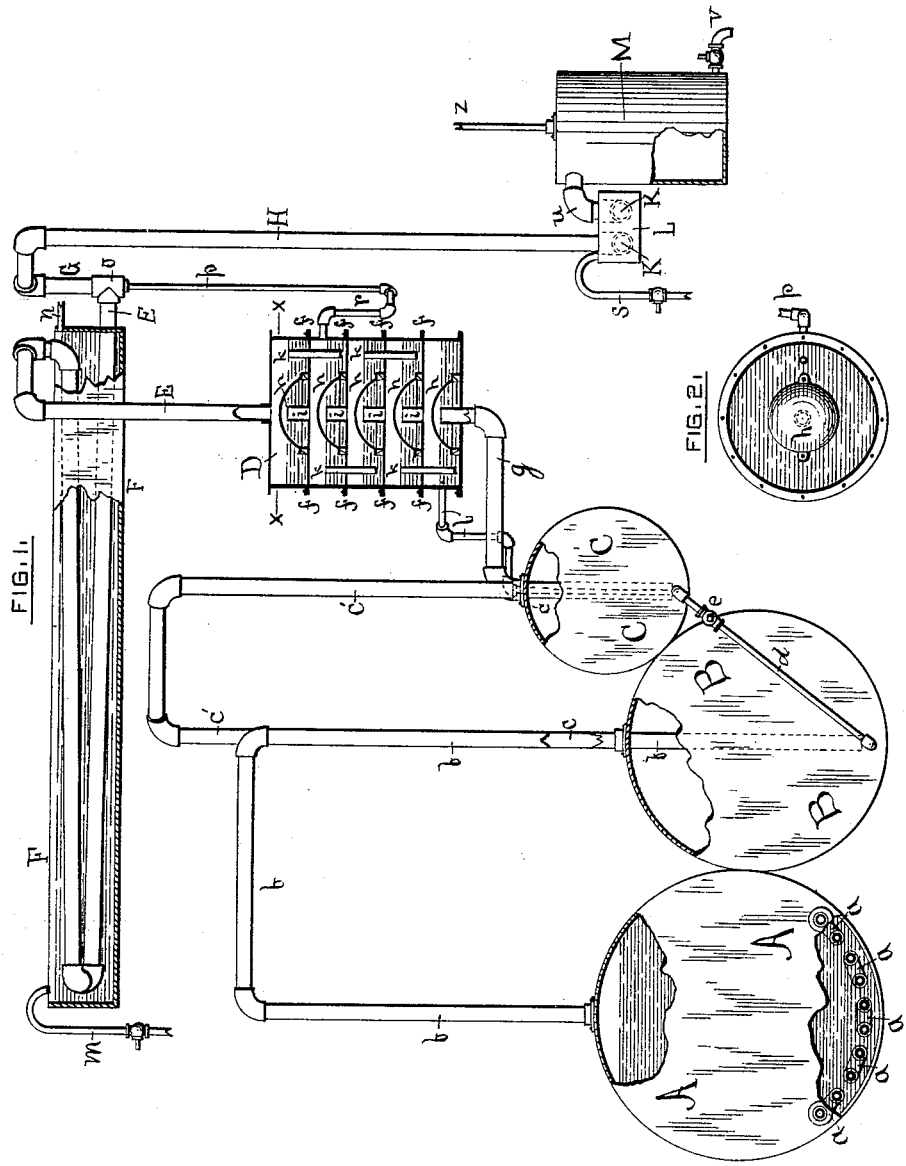
WITNESSES.  INVENTOR.
Geo. A. Carpenter  Bela P. Clapp
George W. Bennefield  By his Attorney,
  Thos. P. Bennefield.

(No Model.)

B. P. CLAPP.
APPARATUS FOR DISTILLING AMMONICAL WATERS.

No. 335,427. Patented Feb. 2, 1886.

WITNESSES:
Geo. A. Carpenter
George W. Barnefield

INVENTOR.
Bela P. Clapp.
By his Attorney
Thos. R. Barnefield.

UNITED STATES PATENT OFFICE.

BELA P. CLAPP, OF PAWTUCKET, RHODE ISLAND.

APPARATUS FOR DISTILLING AMMONIACAL WATERS.

SPECIFICATION forming part of Letters Patent No. 335,427, dated February 2, 1886.

Application filed September 24, 1885. Serial No. 178,013. (No model.)

*To all whom it may concern:*

Be it known that I, BELA P. CLAPP, a citizen of the United States, residing at Pawtucket, in the county of Providence and State of Rhode Island, have invented a new and useful Apparatus for Concentrating the Ammoniacal Waters from Gas-Works, of which the following is a specification.

My said invention relates to obtaining ammonia and its compounds from the ammoniacal waters from gas-works; and it consists in the vaporizing and receiving chambers, in connection with the conducting-pipes and condensing apparatus hereinafter shown and described.

The object of my invention is to obtain the products aforesaid in a concentrated form for the purposes of lessening the cost of transportation, and of furnishing a cheap and concentrated solution of ammonia available for use in many of the arts.

The accompanying drawings are hereby made part of this specification, similar letters of reference thereon indicating corresponding parts.

Figure 1 of said drawings is a front view of the apparatus, partially in section. Fig. 2 is a horizontal section on line $x\,x$ of one of the cylinders. Fig. 3 is a plan of the apparatus.

A is the vaporizing chamber or still, with part of its exterior cut away to show the gas-water therein and the coiled steam-pipes $a\,a\,a\,a\,a$ with which it is supplied. This chamber I have preferred to make of boiler-iron and in a cylindrical form.

B shows a receiving-chamber with its covering partly broken off, made of like form and material as and of about one-half the capacity of the part A, to which it is connected by the conducting-pipe $b$, which runs from the top of A very nearly to the bottom of B, as shown in Fig. 1 of the drawings.

C is another receiving-chamber, showing part of its exterior cut away, and made of like form and material as the parts A and B. This chamber is placed over the part B, as seen in Fig. 3, and is of about one-half the capacity of B, to which it is connected by the conducting-pipe $c'$, running from the top of B nearly to the bottom of C, as shown in Fig. 1. The bottom part of C is also connected with the bottom of B by the smaller pipe $d$, the cock $e$ therein opening and closing the connection between these two chambers, for the purposes hereinafter described.

D is a compartment-chamber or upright hollow column, interiorly divided by the horizontal partitions $f\,f\,f\,f$, and is connected with the part C by the pipe $g$, running from the top of C to and through the bottom of D, as seen in Fig. 1, and extending upward into the lowest compartment of D about one-half the height of said compartment, where the pipe terminates with an open end. Each of the compartments of D communicates with the one immediately over it by a like open-end pipe, (seen at $i\,i\,i\,i$,) over the upper openings of which is placed the inverted-saucer-shaped cap $h\,h\,h\,h$. A downward connection is also made between these compartments by the short open-end pipes $k\,k\,k\,k$, so placed that each compartment will always be about one-half filled with the condensed liquid returned to them, as hereinafter described. The lowest compartment has an outlet through its side at about one-half the height of said compartment, to which the return-pipe $l$ is attached, and from which said pipe extends nearly to the bottom of the chamber C.

From the top compartment of the column D the pipe E extends to and forms a longitudinal coil within the tank F, which tank is filled with cold water fed to it by the supply-pipe $m$, and is furnished with an overflow-pipe. (Seen at $n$.) As the pipe E emerges from the tank F, it is fitted into a T, (seen at $o$,) from which it is continued, as seen at G H. From said T there is also the downward or returning smaller pipe $p$, which is shaped to form the trap $r$, and which extends to and enters the compartment-chamber D, as shown. The pipe H extends to and connects with the condensing-pipe K in the trough L, which trough has the inlet and outlet pipes $s\,t$, and is kept filled with cold water. The connection of the conducting-pipe H with the condensing-pipe K and the connection of this condensing-pipe with the elbow $u$ are both above said trough, for the reason hereinafter stated. From the elbow $u$ there is direct connection with the receiver M, which may be emptied of its contents by the use of the faucet $v$.

$w\,y$ show the feed and return for the steam-coil in the part A.

$z$ is a vent for the receiver M, and O is the outlet for drawing off the exhausted waters from the vaporizing-chamber A. The ammonia and its compounds found in the ammoniacal waters from gas-works are volatilized at a lower temperature than the boiling-point of water, so that when the water is boiled the ammonia is in the vaporized matters in much larger proportion than it was in the ammoniacal water.

Therefore the use of my said apparatus and invention is as follows: The ammoniacal water is pumped into the vaporizing-chamber A until the latter is nearly full, as seen in Fig. 1. This liquor is then boiled by the heat of the steam supplied to the coil $a\ a\ a\ a\ a$. The ammonia and the ammoniacal compounds, together with the steam, pass off from the water through the pipe $b$ into the receiving-chamber B; thence through the pipe $c'$ into the second receiving-chamber, C; from thence the vaporized matters pass through the pipe $g$ to the column D, entering the latter underneath the cap $h$ in the lowest compartment of said column. They are then, by means of said cap $h$, forced down through the water standing in the compartment through the opening between the under edge of the cap $h$ and the bottom of said compartment; thence in like manner they pass upward and into and through each of the compartments in the column D, and are conducted into and through the tank F by the pipe E. The vapors in passing through the pipe E, immersed in the water with which said tank is filled, are partially condensed. As the temperature at which the ammonia compounds are volatilized is lower than the boiling-point of water, so in partially condensing the volatilized matters from the ammoniacal waters the percentage of ammonia in the condensed liquid will be less than in the vapor before condensation. The condensed liquid is separated from the uncondensed vapors at the T, $o$, the uncondensed part being carried upward from the T and down to the condensing-pipe K by means of the pipes G H. This condensing-pipe is so placed within the trough or cold-water bath L that its entrance and exit ends are always above the bath, in order that the whole of the condensing-pipe may be kept constantly filled with the condensed liquid, thus preventing the salts of ammonia from solidifying and stopping up the pipe. The liquid condensed in the pipe E and separated from the uncondensed part at the T $o$ runs back into column D through the pipe $p$, and thence back through the several compartments in said column by means of the short pipes $k\ k$, and through the outlet-pipe $l$ into the chamber C; thence backward through the pipe $d$, when the cock $e$ is opened into the chamber B, from which, all the ammonia being exhausted from it, it is allowed to run to waste through the final outlet at N. The cock $e$ in the pipe $d$ is closed near the end of the running of a charge, or at such time when the ammonia will have been exhausted from the waters in A and B. In the beginning of a new charge the cock $e$ will be opened and the liquid that has collected in C will be allowed to run back into B.

Having thus described my said invention, what I claim as new, and desire to secure by Letters Patent, is—

The above-described apparatus for concentrating the ammonia and its compounds from the waters of gas-works, consisting of the vaporizing-chamber A, supplied with the coiled steam-pipes $a\ a$, the receiving-chambers B C, compartment column D, furnished with the dome-shaped caps $h$ and connecting-pipes $i\ k$, the condensing devices E F K L, together with the conducting-pipes $a\ b\ c\ g$ G H, and the means for returning and discharging the exhausted liquids, (shown by $p\ r\ l\ d\ e$ N,) all constructed in the manner and used for the purposes substantially as set forth.

BELA P. CLAPP.

Witnesses:
   THOS. P. BARNEFIELD,
   GEORGE W. BARNEFIELD.